United States Patent [19]

Burba et al.

[11] 4,053,503
[45] Oct. 11, 1977

[54] PROCESS FOR THE DIMERIZATION OF HEPTADIENE ACID ESTERS

[75] Inventors: Christian Burba, Herbern; Peter Borner, Altluenen, both of Germany

[73] Assignee: Schering Aktiengesellschaft, Berlin and Bergkamen, Germany

[21] Appl. No.: 675,460

[22] Filed: Apr. 9, 1976

[30] Foreign Application Priority Data

Apr. 19, 1975 Germany .............................. 2517376

[51] Int. Cl.$^2$ .............................................. C07C 69/52
[52] U.S. Cl. ................................... 560/202; 260/346.6; 260/407; 260/561 N; 526/321; 526/324
[58] Field of Search ...... 260/485 R, 407 PR, 465.8 D

[56] References Cited

PUBLICATIONS

Angeu Chem. 85, 1034 (1973).

*Primary Examiner*—Jane S. Myers
*Attorney, Agent, or Firm*—Curtis, Morris & Stafford

[57] ABSTRACT

A method for dimerizing heptadiene acid esters in the presence of a catalyst which is a metal of Group IA of the Periodic System or an alcoholate, hydride, amide, or tritylate thereof, or is an alcoholate, hydride, or amide of a metal of Group IIA of the Periodic System.

5 Claims, No Drawings

PROCESS FOR THE DIMERIZATION OF HEPTADIENE ACID ESTERS

The present invention relates to a process for the dimerization of heptadiene acid esters and to the products prepared thereby.

According to the invention, heptadiene acid esters, which are obtained by the reaction of 1,3-diolefins with acrylic acid esters, are dimerized in the presence of a basic catalyst, namely metals of the first Main Group (Group IA) of the Periodic System and their alcoholates, hydrides, amides or tritylates at a temperature from −20° C. to 120° C., or in the presence of the alcoholates, hydrides, or amides of metals of the second Main Group (GROUP IIA) of the Periodic System at a temperature from +20° to 180° C.

The heptadiene acid esters employed according to the present invention as reagents, and their preparation, are described for example in German patent publications (Offenlegungsschriften) DOS 2,005,733 and DOS 2,044,159, both of which are incorporated herein by reference. DOS 2,005,733, for example, teaches that 1,3-dienes such as butadiene, isoprene, and piperylene, as well as 1,3-dienes having further double bonds, such as octatriene or 3-methyl heptatriene, can be copolymerized in the presence of ethylene per se or of $\alpha,\beta$-unsaturated ethylene compounds such as acrylic acid esters in the presence of a cycloolefin-cobalt-complex catalyst. The process proceeds in the presence of inert solvents such as benzene or toluene, ether or saturated paraffin hydrocarbons, at normal pressure or elevated pressure up to 50 atmospheres and at temperatures from −20° C. to +120° C., preferably at 40° C. to 90° C. Depending on the catalyst and the conditions of reaction, the isomeric content of the product is variable. For example, Examples 1 − 4 of this patent show the production of isomeric mixtures in which n-heptadiene-(trans-2,cis-5)-acid methyl ester varies between 59.5 percent and 86.3 percent, that of n-heptadiene -(trans-4,6)-acid methyl ester varies between 5.4 percent and 26.2 percent. Three other isomers of n-heptadiene acid methyl ester are found in these mixtures in relatively minor amounts, ranging, for example, from 0.2 percent to 4.8 percent. In each case, the products are obtained by the reaction of butadiene with methyl acrylate.

Similarly, DOS 2,044,159 teaches the reaction of dienes such as butadiene-1,3; isoprene; pentadiene-1,3; or 2,3-dimethylbutadiene-1,3 with acrylates at temperatures between 50° and 150° c. at atmospheric or superatmospheric pressures to produce linear doubly-unsaturated carboxylic acid esters in the presence of an organometallic complex of elemental iron and an electron donor which is a triaryl compound of an element of Group VA of the Periodic System. The reaction of acrylates with butadiene is taught to produce a miture of heptadiene-(cis-2,5)-acid esters and heptadiene-(trans-2, cis-5) acid esters in a ratio of about 1:2. The esters obtained are subsequently isolated from the reaction mixture and optionally convereted into the free carboxylic acids by hydrolysis.

For example, by the mixed oligomerization of butadiene and methyl acrylate in the presence of cobalt catalysts [cf. Angew. Chem. 85, 1034 (1973)], an isomeric mixture of heptadiene acid methyl esters is prepared wherein the trans-2, cis-5-isomer, with its isolated double bonds, clearly predominates in comparison with the conjugated product:

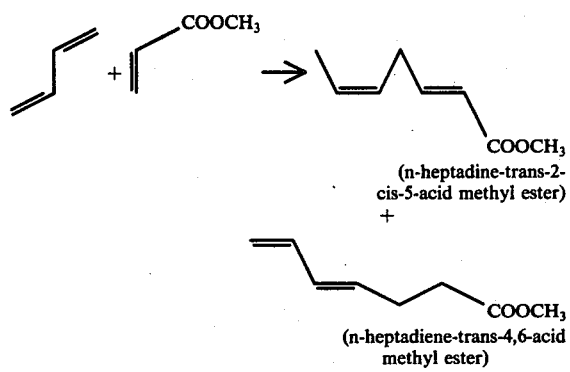

Among the basic catalysts which can be used as dimerization catalysts according to the present invention, the metals of the first Main Group (Group IA) of the Periodic System, their alcoholates (suitably lower alkanolates), hydrides, amides, or tritylates, are preferred. Among these materials, lithium, sodium, and potassium are preferred.

Equivalently, but with the attainment of smaller yields, metals of the second Main Group (Group IIA) of the Periodic System can be used, as well as their alcoholates hydrides, and amides, such as barium hydride, calcium hydride, calcium amide, and barium ethylate.

The surprising advantage of the dimerization catalysts according to the present invention is that, under conventional conditions, a much higher degree of dimerization is attained without any significant reduction in the content of conjugated double bonds in the remaining undimerized monomer portion.

A further advantage of the process of the invention is that it is possible to direct the reaction process so that only particular isomers, desired with a view to their ultimate use, are formed. Thus, by the use of strongly basic catalysts such as lithium, sodium, and potassium at moderate reaction temperatures, preferred dimerization products with the structures I.
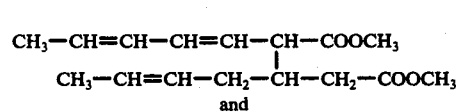

and

II.
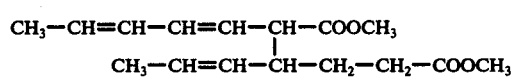

are formed. Evidence for these structures is supplied by nuclear magnetic resonance-, infrared-, ultraviolet-, and mass-spectrograms.

When less strongly basic catalysts such as barium hydride are used at elevated reaction temperatures, a dimerization product is obtained which is thermally less stable than the products identified by formulas I and II above (cf. the following Table).

The sharp separation of the isomers is particularly important in view of their differing thermal stability, if demands of this kind are to be made on the products.

TABLE I

|  | Isomeric Mixture of Compounds According to Formulas I and II | Dimerization Product Prepared at Elevated Temperature |
| --- | --- | --- |
| Before thermal stress | | |
| Purity according to gas chromatogram | ca. 96% $C_{14}$-ester | ca. 96% $C_{14}$-ester (of which 33% of the isomer mixture is compounds of the formulas I and II) |
| $n_D^{20}$ | 1.4945 | |
| Saponification number (7 hours ethanolic KOH 0.5 N) | 400 (theory 400) | 400 (By preparative gas-liquid-chromatographic separation, the proportion of 33% of isomerization products of formulas I and II can be decreased to about 10%. A product so enriched has an $n_D^{20} = 1.5005$) |
| After thermal stress for 25 hours at 200° C. | | |
| $N_D^{20}$ | 1.4945 | 1.500 |
| Saponification number (7 hours ethanolic KOH 0.5 N) | 392 (theory 400) | 348/349 |

The temperature region employable in the process of the present invention generally includes temperatures from −20° C. to 120° C. When less active catalysts are employed, this temperature can also be exceeded and the dimerization can be carried out at temperatures up to 180° C. The preferred temperature region for the active alcoholates is between −20° C. and 50° C.; for the hydrides, between 20° C. and 120° C.; and for the amides from 50° C. to 100° C. Fundamentally, the reaction temperature depends on the activity of the catalyst, the reaction time, and the desired final product. The more active the catalyst and the longer the reaction time, the lower can be the reaction temperature. Conversely, when less-active catalysts are used or when shorter reaction times are employed, a correspondingly higher temperature is chosen, with the upper temperature limit being dependent on the kind of dimerization product desired. In case it is desired, an oligomerization proceeding beyond dimerization can also be obtained according to the process of the present invention.

The amount of catalyst depends on the kind and activity of the catalyst and is between 0.1 and 6 percent, particularly between 0.1 and 1 percent, by weight of the monomeric starting materials.

The products prepared by the process of the invention are suitable for use as drying agents.

The extent of the ability of a material to dry is expressed by the iodine number. In general, the following rough categories are conventional:

| | |
| --- | --- |
| Iodine number > 150 | : Drying oil |
| Iodine number = 150-100 | : Half-drying oil |
| Iodine number < 100 | : Non-drying oil |

The dimerized heptadiene acid esters of the invention can be characterized as drying oils, i.e. they are oily organic liquids which, in the form of films, absorb atmospheric oxygen and dry with the formation of a relatively hard elastic substance.

In contrast to the synthetic drying oils obtained according to the present invention, known naturally-occuring drying oils have the following disadvantages:

1. In all naturally-occurring fatty acid mixtures containing linoleic acid and linolenic acid, there is a considerable portion of non-drying components;
2. The linoleic acid content of naturally-occurring oils is subject to large variations which depend, for example, on the origin of the oil seeds as well as on the time of harvest and on climatic influences;
3. Drying oils with a linolenic acid content tend easily to yellowing on weathering, because of the three unsaturations therein.

The advantages of the synthetic oils of the present invention, in comparison with the naturally-occurring oils with respect to their drying properties, are evident from following Table 2.

Table 2

| Characteristics of Drying Substances before and after Drying with Air Total reaction time = 240 hours at 60° C. and 15 l of air per hour | | | | |
| --- | --- | --- | --- | --- |
| | | Isomeric Mixture of Compounds According to Formulas I and II | Dimerization Product Prepared at Elevated Temperature | Ricinine Fatty Acid Ester |
| Iodine number (Woburn) | Beginning | 186 | 182 | 152 |
| | End | 91 | 87 | 65 |
| Acid number | Beginning | 0.8 | 0.6 | 0.5 |
| | End | 20.8 | 22.0 | 33.5 |
| Viscosity/20° C. (poises) | Beginning | 0.28 | 0.24 | 0.08 |
| | End | 145.1 | 86.2 | 3.3 |
| $n_D^{20}$ | Beginning | 1.4940 | 1.4991 | 1.4680 |
| | End | 1.4979 | 1.4988 | 1.4721 |

Further, the products produced according to the present invention are valuable intermediates for further syntheses.

Thus, for example, by a Diels-Alder type addition with maleic acid anhydride, adducts are obtained which can be used as hardeners.

By free-radical polymerization of the dimerization products obtained according to the present invention, polyfunctional carboxylic acid derivatives are obtained which are suitable as cross-linking agents in the preparation of highly-cross-linked polyesters and polyamides.

By a copolymerization with other polymerizable compounds such as styrene and maleic acid anhydride, solid, nontacky, but still-soluble resins are obtained, which resins have softening points which facilitate good workability.

By reaction with an excess of polyols, corresponding trans-esterification products are obtained, as is conventional in the preparation of alkyd resins.

A reaction with excess polyamines leads to the production of the corresponding polyaminoamides, which can be used as hardeners for epoxy resins.

Further, by hydrogenation, the products obtained according to the invention can be converted into the corresponding saturated compounds. By alkaline hydrolysis, the salts of the corresponding carboxylic acids are obtained.

A better understanding of the present invention and of its many advantages will be had by referring to the following examples, given by way of illustration. Examples A - E show the use of the compounds of the invention, while Examples 1 - 10 show the preparation of the compounds.

EXAMPLE A

Polymer formed from Dimerized Heptadiene Acid Methyl Ester (Isomer Mixture I + II) and Styrene in a Mol Ratio of 1:4

28.0 g of dimerized heptadiene acid methyl ester (iodine number according to Woburn = 193, saponification number = 396) are mixed with 41.6 g of styrene and combined with 1.8 g of ditertiary butyl peroxide. The batch is heated under nitrogen for about 32 hours at 140° - 150° C. On cooling to room temperature, a solid non-tacky resin is obtained which is soluble in chloroform and tetrahydrofuran. Properties of the reaction product:

Softening point (Kofler bench) = 70° C.
Saponification number = 140.

EXAMPLE B

Trans-esterification of Dimerized Heptadiene Acid Methyl Ester (Isomer Mixture I + II) with Hexanediol-1,6 in a Mol Ratio of 1:2

28.0 g of dimerized heptadiene acid methyl ester are mixed with 23.6 g of hexanediol-1,6 are combined with 0.5 g of magnesium methylate. The reaction mixture is slowly heated under nitrogen, with stirring, to 180° C. With distillative removal of methanol, in about 24 hours a product is obtained which has drying properties and an hydroxy number of 256 (248 calculated).

EXAMPLE C

An Aminoamide formed from Dimerized Heptadiene Acid Methyl Ester (Isomer Mixture I + II) with Diethylene Triamine in a Mol Ratio of 1:2

28.0 g of dimerized heptadiene acid methyl ester are mixed with 20.6 g of diethylene triamine and heated slowly under nitrogen and with stirring to a maximum of 190° C. With distillative removal of methanol, an aminoamide having an amine number of 506 (calculated 531) is obtained.

EXAMPLE D

Adduct formed for Maleic Acid Anhydride and Dimerized Heptadiene Acid Methyl Ester (Isomer Mixture I + II)

40.0 g of dimerized heptadiene acid methyl ester and 14.0 g of maleic acid anhydride are heated under nitrogen according to the following schedule:
about 5 hours at 100° - 110° C.;
about 8 hours at 120° - 130° C.; and
about 8 hours at 140° - 150° C.

Subsequently, the batch is heated in the vacuum produced by a water aspirator so that no free maleic acid anhydride remains. A viscous oil having an iodine number of 127/128 (according to Woburn) is obtained.

EXAMPLE E

Free Radical Polymerization of Dimerized Heptadiene Acid Methyl Ester (Isomer Mixture I + II)

50.0 g of dimerized heptadiene acid methyl ester (iodine number according to Woburn = 193; saponification number = 396) are combined with 3.2 g of di-tertiary butyl peroxide and stirred under nitrogen at 150° - 160° C. for about 20 hours. A viscous oil is obtained which, on heating in vacuum, contains only traces of unreacted starting material. The properties of the reaction product are:

Iodine number (according to Woburn) = 102
Saponification number = 370.

In the following Examples, the dimerization of heptadiene methyl ester is shown as a preferred embodiment. However, the method is applicable in similar fashion to other heptadiene acid esters, and particularly to those having 1 - 6 carbon atoms in the alkanol portion thereof. Esters unsaturated in the 2,5-position are particularly suitable.

EXAMPLE 1

0.3 g of sodium, cut into small pieces, is added at room temperature to 300 g of heptadiene acid methyl ester. At first, the temperature rises slowly, then more quickly, to 85° C. The mixture is permitted to react for a further three hours without external heating. Residual sodium is removed. The reaction product is taken up in petroleum ether, acidified with dilute hydrochloric acid, and subsequently washed until neutral. The product is dried over sodium sulfate. According to the gas chromatogram, a product with about 83 percent of dimerized heptadiene acid methyl ester is obtained, which product contains 79 percent of compounds of the formulas I and II shown earlier herein. The index of refraction of the starting material is $n_D^{20} = 1.4640$; that of the worked-up final product is $n_D^{20} = 1.4920$.

EXAMPLE 2

100 g of heptadiene acid methyl ester are cooled under nitrogen to $-15°$ C. At this temperature, over a period of about six hours, 1 g of potassium-tert.-butylate in 6 ml of dimethyl formamide is added with stirring. Thereafter, the same amount of catalyst is quickly added. The batch is let come to room temperature and is subsequently worked up as in Example 1.

The reaction product, according to a gas chromatogram, has a composition of about 80 percent of dimerized heptadiene acid methyl esters of the formulas I and II and about 6 percent of conjugated heptadiene acid methyl ester. By distillative removal of the conjugated monomeric heptadiene acid methyl ester, which can be re-subjected to dimerization, a dimerized product having the following characteristics is obtained in about 95 percent purity:

| | |
|---|---|
| b.p.$_{0.5}$ | = 130° - 132° C. |
| $n_D^{20}$ | = 1.4940 |
| Saponification number (7 hours in 0.5 N ethanolic KOH) | = about 400. |

EXAMPLE 3

0.5 g of $CH_3OK \cdot CH_3OH$ (potassium methylate with methanol of crystallization) is added at 20° C. to 50 g of heptadiene acid methyl ester. The temperature of the batch rises thereby to about 100° C. The reaction mixture is let cool to room temperature and is worked up according to Example 1. The index of refraction at the beginning of the reaction is $n_D^{20} = 1.4645$; at the end of the reaction, $n_D^{20} = 1.4991$. The reaction product, according to a gas chromatogram, contains about 82 percent of di- and trimerized heptadiene acid methyl ester and has a saponification number of 360.

EXAMPLE 4

15 g heptadiene acid methyl ester are combined with 0.15 g NaH (about 50 percent in oil). The temperature of the reaction mixture increases within a few minutes from room temperature to about 80° C. The mixture is permitted to react for a further two hours without external heating and is then worked up according to Example 1. The index of refraction at the beginning of the reaction is $n_D^{20} = 1.4645$; at the end of the reaction, $_D^{20} = 1.4896$. According to a gas chromatogram, the reaction product contains about 54 percent of dimerized heptadiene acid methyl ester and about 28 percent of conjugated heptadiene acid methyl ester.

EXAMPLE 5

100 g of heptadiene acid mthyl ester are added dropwise to 1 g of $NaNH_2$ (about 50 percent) over a period of about 45 minutes such that a maximum temperature of 60° C. is not exceeded. The reaction mixture is then let cool to room temperature and, after standing overnight, is worked up according to Example 1. At the beginning of the reaction, $n_D^{20} = 1.4645$; at the end of the reaction, $n_D^{20} = 1.4910$. According to a gas chromatogram, the reaction product contains about 72 percent of dimerized heptadiene acid methyl ester, of which approximately 57 percent corresponds to compounds of the formulas I and II, and about 25 percent is conjugated heptadiene acid methyl ester.

EXAMPLE 6

An ether solution of triphenylmethyl-sodium, prepared from 3.3 g of triphenyl chloromethane and the corresponding amount of sodium amalgam according to Org. Synth. Collect., Vol. 2, 607, is put in a reaction flask and freed of ether. 50 g of heptadiene acid methyl ester are added without interruption to this catalyst. The temperature of the reaction mixture quickly rises to 80° C. - 90° C. The reaction mixture is let cool to room temperature and is then stirred for one hour at room temperature. The reaction mixture is worked up according to Example 1. According to a gas chromatogram, the product is composed of about 50 percent of dimerized heptadiene acid methyl ester corresponding with compounds of the formulas I and II and about 30 percent of conjugated heptadiene acid methyl ester.

EXAMPLE 7

40 g of heptadiene acid methyl ester are combined with 1.6 g of barium hydride and the mixture is warmed to 150° C. This reaction temperature is maintained for a period of 8 hours and the reaction product is subsequently worked up according to Example 1. According to a gas chromatogram, the reaction product contains about 69 percent of dimerized heptadiene acid methyl ester in addition to 13 percent of conjugated heptadiene acid methyl ester.

EXAMPLE 8

30 g of conjugated heptadiene acid methyl ester are cooled to about 0° C. and combined over one hour with a slurry of 0.9 g of K-tert.-butylate in 10 ml of dimethyl formamide. The mixture is permitted to react for about 3 hours at 0° C. - 5° C. and then is worked up according to Example 1. According to a gas chromatogram, the reaction product contains about 45 percent of dimerized heptadiene acid methyl ester.

EXAMPLE 9

5.0 g of dimerized heptadiene acid methyl ester are warmed to about 100° C. with 0.2 g of metallic sodium. After removal of heat, 50 g of heptadiene acid methyl ester are added dropwise at such a rate that the temperature of the reaction mixture varies between 85° C. and 100° C. (without cooling or heating). By proceeding in this manner, the heat effect of even larger batches can be well controlled. After the usual working up, about 70 percent of dimerized heptadiene acid methyl ester are obtained, according to a gas chromatogram.

EXAMPLE 10

About 0.5 g of sodium wire, as a catalyst, is placed on a glass frit mounted in a glass tube. Then, 100 g of heptadiene acid methyl ester are continuously dosed onto the catalyst and the reaction product is drawn off at the lower end of the reaction tube at such a rate that the temperature of the reaction mixture over the frit does not exceed 140° C. The rate of dosing of the cold heptadiene acid methyl ester and the removal of the warm reaction mixture must be adjusted with respect to each other. Operating in this continuous fashion, about 60 percent of dimerized heptadiene acid methyl ester are obtained, according to a gas chromatogram.

EXAMPLE 11

0.4 g of lithium are added to 40 g of heptadiene acid methyl ester. The temperature rises slowly to about 40° C. The reaction is held for about 3 hours at 30° - 35° C. The product is left to stand overnight at room temperature and then is worked up according to Example 1. According to the gas chromatogram, the reaction product contains about 18 percent of dimerized heptadiene acid methyl ester in addition to conjugated heptadiene methyl ester.

What is claimed is:

1. A method for dimerizing heptadiene acid esters which comprises contacting the heptadiene acid esters at −20° C. to +120° C. with a basic catalyst selected from the group consisting of metallic lithium, sodium, and potassium, and the alcoholates, hydrides, amides, and tritylates of these metals, or contacting the heptadiene acid esters at a temperature from +20° C. to 180° C. in the presence of a basic catalyst selected from the group consisting of alcoholates, hydrides, and amides of barium and calcium.

2. A method as in claim 1 wherein said basic catalyst is metallic lithium, sodium, or potassium.

3. A method as in claim 1 wherein said basic catalyst is an alcoholate, hydride, amide, or tritylate of lithium, sodium, or potassium.

4. A method as in claim 1 wherein said catalyst is barium hydride

5. An isomeric mixture consisting essentially of compounds having the formulas

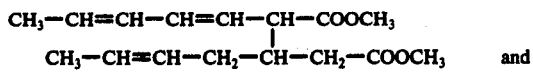

and

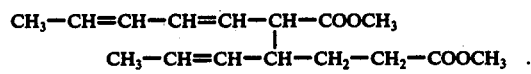

* * * * *